United States Patent [19]

Marcheix et al.

[11] 4,411,441
[45] Oct. 25, 1983

[54] MOUNTING FOR A FUEL TANK OF SYNTHETIC MATERIAL

[75] Inventors: Raymond Marcheix, Paris; Christian Desiage, Rueil Malmaison, both of France

[73] Assignee: Regie Nationale des Usines Renault, Boulogne-Billancourt, France

[21] Appl. No.: 271,129

[22] Filed: Jun. 8, 1981

[30] Foreign Application Priority Data

Jun. 6, 1980 [FR] France ............................ 80 12623

[51] Int. Cl.³ ............................................. B60K 15/02
[52] U.S. Cl. .................................................. 280/5 A
[58] Field of Search .............. 280/5 R, 5 A; 180/68.4; 244/135 R

[56] References Cited

U.S. PATENT DOCUMENTS 1,500,646  7/1924  Sergardi ........................... 280/5 A
4,121,682 10/1978  Schaal et al. ...................... 180/68.4
4,234,050 11/1980  Condon ............................. 280/5 R

FOREIGN PATENT DOCUMENTS 488886 of 0000 France .
1510002 12/1966 France .
1227897 4/1971 United Kingdom .

Primary Examiner—John A. Pekar
Assistant Examiner—D. Lynn Fugate
Attorney, Agent, or Firm—Oblon, Fisher, Spivak, McClelland & Maier

[57] ABSTRACT

A mounting assembly for a fuel tank of synthetic material including a first and second L-shaped side rail each including a horizontal end portion, a cross member interconnecting the first and second L-shaped side rails and having at least one opening formed therein, at least one protuberance extending from a front face portion of the tank cooperatively engaging the at least one opening located in the cross member and first and second lateral attachment lugs connected to the tank for cooperative engagement with the horizontal end portions of the first and second L-shaped side rails.

6 Claims, 5 Drawing Figures 4,411,441

MOUNTING FOR A FUEL TANK OF SYNTHETIC MATERIAL

BACKGROUND OF THE INVENTION

1. Field of the Invention:

The present invention refers to a device for mounting a fuel tank of synthetic material, in particular for automobiles.

2. Description of the Prior Art:

Fuel tanks of synthetic material are most often mounted onto the structure of a vehicle by means of two metal bands sheathed in rubber so as to avoid the metal's abrasiveness on the tank. In addition, the mounting of these bands onto the vehicle's structure necessitates the installation of supplemental reinforcements. A phenomenon of creeping is often observed in the synthetic material, accentuated by increases in the utilization temperature. This leads to a reduction in the effectiveness of the tank's securance.

The above-noted type of mounting is not very economical and penalizes the mounting function of such a reservoir in comparison with a sheet-metal tank, which is achieved more simply with screws, washers and nuts. When a vehicle is operated, the tank is subjected to vertical, transversal and longitudinal accelerations due to braking and it must therefore be held positively on the chassis.

SUMMARY OF THE INVENTION

The object of the present invention is to alleviate the above-mentioned difficulties by means of an economically achievable solution.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or correspondings parts throughout the several views, and wherein.

DETAILED DESCRIPTION OF THE PREFERRED EMBODIMENTS

Figure 1:
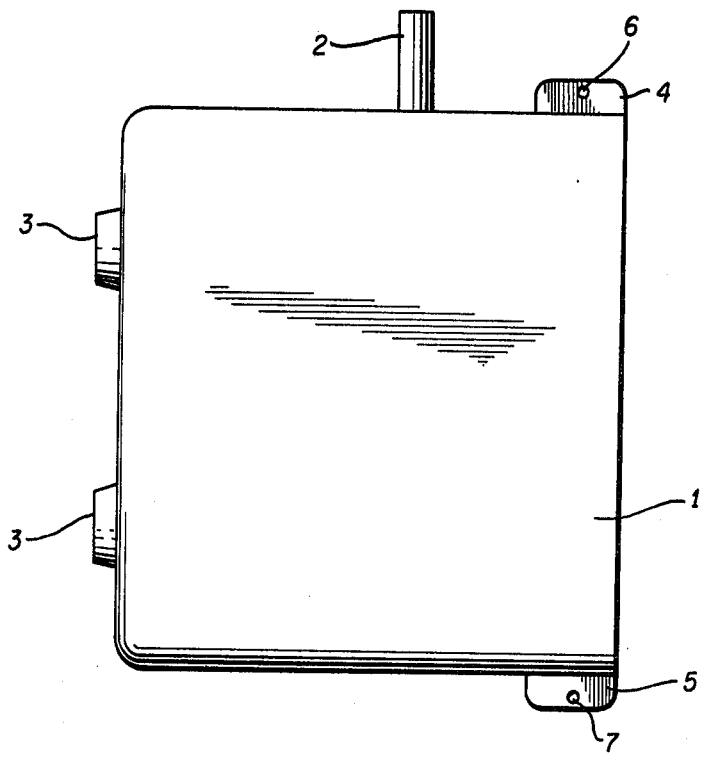
FIG. 1 sets forth a top view of the tank utilized according to the invention.
Figure 3:
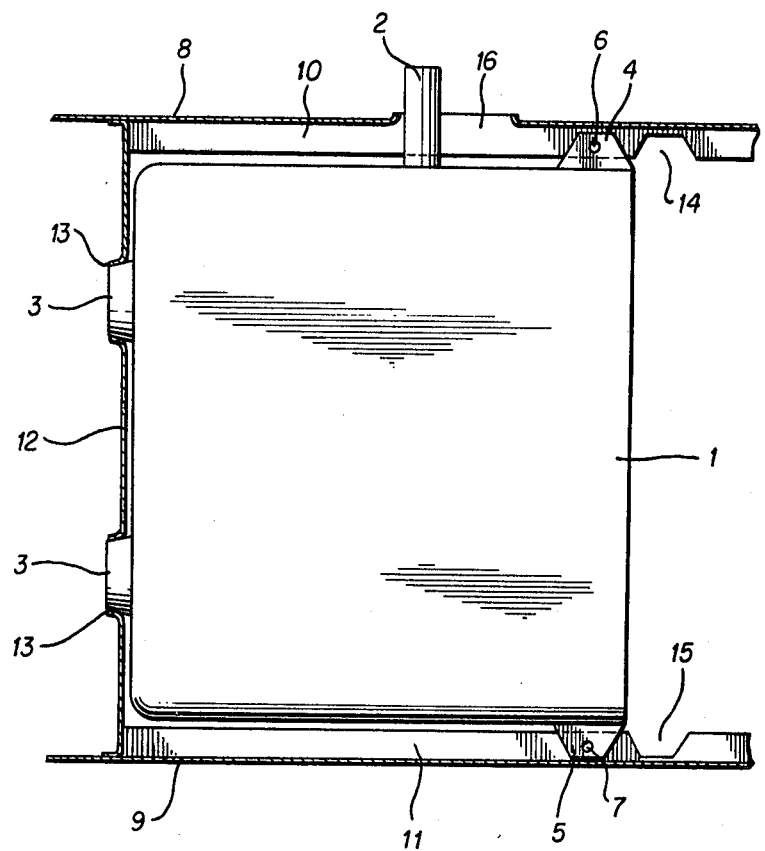
FIG. 3 is a view from above of the tank, mounting completed.

A tank 1 shown in FIG. 1 has a nozzle 2, at least one front protuberance 3, and lateral attachment lugs 4 and 5 provided with holes 6 and 7 for the passage of appropriate attachments. In FIG. 3 it can be seen that the rear part of the vehicle's chassis supporting tank 1 has two L-shaped side rail members 8, 9 the lower horizontal ends 10, 11 of which are arranged face to face, and joined transversally towards the front of the vehicle by a cross member 12 with receiving openings 13 parallel to the tank's protuberances 3. Lower horizontal ends 10, 11 of the side rails are cut to form indented passage portions 14, 15 so as to allow the passage of the tank's lugs 4, 5. This is also the case at oversized opening 16 for the vertical wall of the right side rail 8 for the introduction of nozzle 2.

Figure 2:
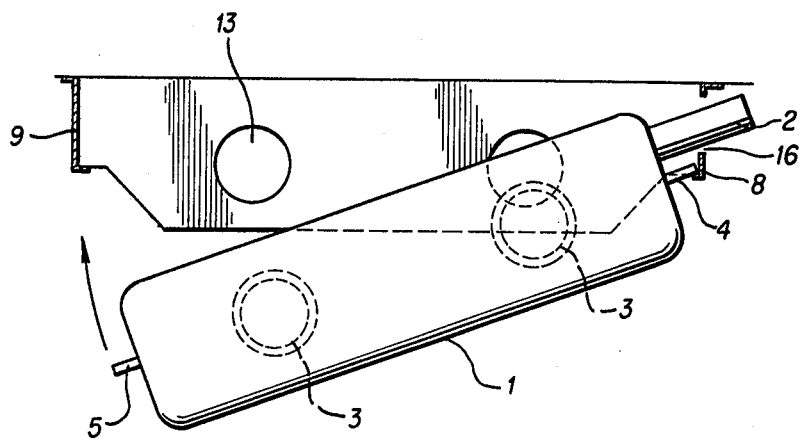
FIG. 2 shows a view from the rear of the vehicle of the tank during mounting.

Assembly of tank 1 is achieved as best shown in FIG. 2. First, nozzle 2 is placed in oversized opening 16 in side rail 8 by bringing tank 1 in obliquely; then it is progressively brought to a horizontal position, with the attachment lugs 4, 5 passing through indented passage portions 14, 15 provided for this purpose in side rails 8, 9.

Tank 1 is then pushed towards the front of the vehicle (i.e. the left side in FIG. 3) such that protuberances 3 fit into the openings 13 in cross member 12 facing them. In this position, it will be noted that lugs 4–5 are fully resting on a part of the lower horizontal ends 10, 11 of side rails 8, 9.

Figure 5:
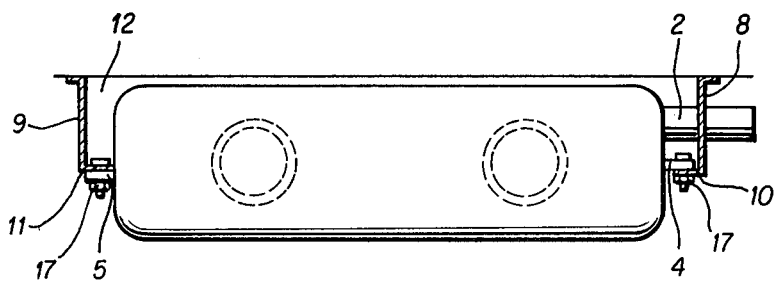
FIG. 5 is a rear view of the alternate embodiment shown in FIG. 4.

A complementary thrust is then exerted on tank 1 towards the front in order to create a slight strain on protuberances 3 in openings 13, thus assuring secure holding of the unit. In this position, holes 6 and 7 in attachment lugs 4, 5 face two holes made in the lower ends 10, 11 of side rails 8, 9, thus allowing the passage of a member for holding tank 1 in position, for example as shown by bolts 17 (FIG. 5).

Figure 4:
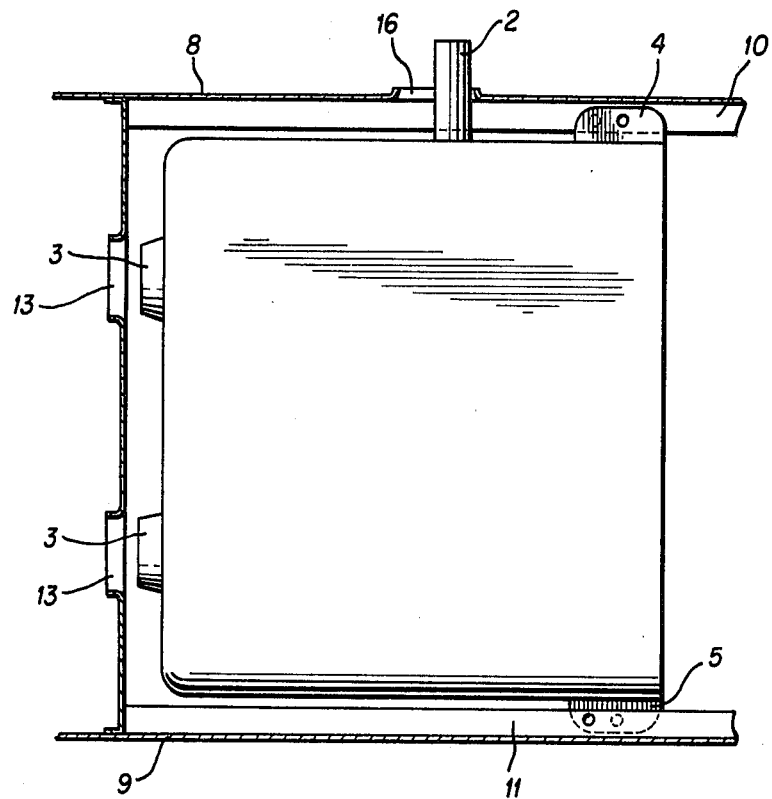
FIG. 4 is a top view of an alternate embodiment of the mounting shown in FIG. 3.

An alternate embodiment of the invention shown in FIG. 4 essentially follows from the preceding embodiment. In the second embodiment, protuberances 3 of tank 1 fit into complementary openings 13 provided in cross member 12, attachment lugs 4, 5 cooperate with lower horizontal ends 10, 11 of the L-shaped side rails 8, 9 and nozzle 2 is introduced into passage 16 in the vertical face of right side rail 8. However, the difference between the mountings of the tank in FIGS. 3 and 4 is found in the relative arrangement of attachment lugs 4, 5 and lower ends 10, 11 of side rails 8, 9.

Indeed, in the latter case, no passage portions such as passage portions 14, 15 are provided in side rails 8, 9. Mounting of tank 1 is achieved as previously noted by presenting nozzle 2 obliquely and introducing it into opening 16 in side rail 8, then bringing it horizontal, with lug 4 resting at the surface of end 10 of side rail 8. However, unlike the first embodiment, second attachment lug 5 comes into contact with end 11 of said rail 9 at a lower part thereof, to which it is attached. In this case as well, this operation takes place after creation of a certain fitting strain between protuberances 3 and openings 13 in cross member 12. This final assemblage is visible in FIG. 5.

Naturally, it would not be beyond the scope of the invention to make minor variations, for example by changing the placement of the openings in the side rails or the number of attachment lugs or protuberances, etc.

Also, obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mounting assembly for a fuel tank, having a nozzle extending therefrom, of synthetic material for automobiles comprising:

a first and second L-shaped side rail each including a horizontal end portion, said first side rail having an opening formed therein within which said nozzle is positioned;

a cross member interconnecting said first and second L-shaped side rails and having at least one opening formed therein;

at least one protuberance extending from a front face portion of said tank cooperatively engaging said at least one opening formed in said cross member; and first and second lateral attachment lugs connected to said tank cooperatively engaging said horizontal end portions of said first and second L-shaped side rails.

2. A mounting assembly for a fuel tank of synthetic material for automobiles comprising:

a first and second L-shaped side rail each including a horizontal end portion;

a cross member interconnecting said first and second L-shaped side rails and having at least one opening formed therein;

at least one protuberance extending from a front face portion of said tank cooperatively engaging said at least one opening formed in said cross member; and first and second lateral attachment lugs connected to said tank cooperatively engaging said horizontal end portions of said first and second L-shaped side rails wherein each said horizontal end portions of said first and second L-shaped side rails have notched indentations formed therein so as to allow passage of said lateral attachment lugs therethrough during assembly and such that said first and second lateral attachment lugs are positioned adjacent said horizontal end portions of said first and second L-shaped side rails upon cooperative engagement of said at least one protuberance with said at least one opening in said cross member.

3. A mounting assembly for a fuel tank of synthetic material for automobiles comprising:

a first and second L-shaped side rail each including a horizontal end portion;

a cross member interconnecting said first and second L-shaped side rails and having at least one opening formed therein;

at least one protuberance extending from a front face portion of said tank cooperatively engaging said at least one opening formed in said cross member; and first and second lateral attachment lugs connected to said tank cooperatively engaging said horizontal end portions of said first and second L-shaped side rails wherein said first lateral attachment lug is located on one side of the tank and is positioned on an upper surface portion of the horizontal end portion of the first L-shaped side rail and the second lateral attachment lug is positioned on an opposite side of the tank and contacts a lower surface portion of the horizontal end of the second L-shaped side rail.

4. A mounting for a tank according to claim 1, further comprising:

means for attaching the tank to said first and second L-shaped side rails upon cooperative engagement of said at least one protuberance with said at least one opening in said cross member so as to create a slight strain between said at least one protuberance and said at least one opening in said cross member.

5. A mounting for a tank according to claim 2, further comprising:

means for attaching the tank to said first and second L-shaped side rails upon cooperative engagement of said at least one protuberance with said at least one opening in said cross member so as to create a slight strain between said at least one protuberance and said at least one opening in said cross member.

6. A mounting for a tank according to claim 3, further comprising:

means for attaching the tank to said first and second L-shaped side rails upon cooperative engagement of said at least one protuberance with said at least one opening in said cross member so as to create a slight strain between said at least one protuberance and said at least one opening in said cross member.

* * * * *